United States Patent
Eltoft et al.

(10) Patent No.: US 10,225,467 B2
(45) Date of Patent: Mar. 5, 2019

(54) 360° VIDEO MULTI-ANGLE ATTENTION-FOCUS RECORDING

(71) Applicant: MOTOROLA MOBILITY LLC, Chicago, IL (US)

(72) Inventors: Justin Eltoft, Pleasant Prairie, WI (US); Michael Gunn, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 638 days.

(21) Appl. No.: 14/803,477

(22) Filed: Jul. 20, 2015

(65) Prior Publication Data

US 2017/0026571 A1  Jan. 26, 2017

(51) Int. Cl.
*H04N 5/232* (2006.01)
*H04N 5/77* (2006.01)

(52) U.S. Cl.
CPC ..... *H04N 5/23238* (2013.01); *H04N 5/23216* (2013.01); *H04N 5/77* (2013.01)

(58) Field of Classification Search
CPC .. H04N 5/23238; H04N 5/77; H04N 5/23216; H04N 5/232
USPC .......................................................... 348/39
See application file for complete search history.

(56) References Cited

U.S. PATENT DOCUMENTS

| | | | | | |
|---|---|---|---|---|---|
| 5,444,478 | A | * | 8/1995 | Lelong | H04N 5/23238 348/38 |
| 6,754,370 | B1 | * | 6/2004 | Hall-Holt | G01B 11/25 356/3 |
| 2001/0055373 | A1 | * | 12/2001 | Yamashita | G01C 21/26 379/90.01 |
| 2001/0055422 | A1 | * | 12/2001 | Roustaei | G03F 7/705 382/181 |
| 2001/0055484 | A1 | * | 12/2001 | Kochi | G03B 35/00 396/324 |
| 2002/0119800 | A1 | * | 8/2002 | Jaggers | H04M 1/72527 455/556.1 |
| 2002/0181415 | A1 | * | 12/2002 | West | H04L 67/34 370/312 |
| 2003/0160868 | A1 | * | 8/2003 | Kakou | G08B 13/19602 348/143 |
| 2003/0220971 | A1 | * | 11/2003 | Kressin | H04L 12/1822 709/204 |
| 2004/0239763 | A1 | * | 12/2004 | Notea | H04N 5/222 348/169 |
| 2004/0246333 | A1 | * | 12/2004 | Steuart, III | G03B 35/08 348/36 |
| 2005/0001024 | A1 | * | 1/2005 | Kusaka | H04N 1/00281 235/375 |

(Continued)

*Primary Examiner* — Peter D Le
(74) *Attorney, Agent, or Firm* — Miller, Matthias & Hull LLP

(57) ABSTRACT

A system and method of capturing view-point-encoded 360° video data with a 360° camera includes capturing a frame of video including a substantially 360° view and contemporaneously receiving position information from one or more mobile electronic devices such as cellphones linked to the camera. The position information identifies a viewpoint associated with each mobile electronic device. The camera records the captured video frame and the received position information together such that one or more of the viewpoints may be selected during later playback.

14 Claims, 6 Drawing Sheets

(56) References Cited

U.S. PATENT DOCUMENTS

| | | | | |
|---|---|---|---|---|
| 2008/0154494 A1* | 6/2008 | Kato | ............... | G01C 21/3638 |
| | | | | 701/454 |
| 2008/0253613 A1* | 10/2008 | Jones | ................... | G06F 3/017 |
| | | | | 382/103 |
| 2009/0009605 A1* | 1/2009 | Ortiz | ................... | H04N 5/232 |
| | | | | 348/157 |
| 2010/0110192 A1* | 5/2010 | Johnston | ............ | H04N 5/2251 |
| | | | | 348/148 |
| 2011/0134245 A1* | 6/2011 | Khizhnichenko | .. | G06K 9/00771 |
| | | | | 348/148 |
| 2012/0165077 A1* | 6/2012 | Ueno | ................ | G06F 1/1696 |
| | | | | 455/566 |
| 2012/0249586 A1* | 10/2012 | Wither | ............. | H04N 1/00323 |
| | | | | 345/633 |
| 2013/0016184 A1* | 1/2013 | Gabel | .................. | H04N 5/33 |
| | | | | 348/46 |
| 2014/0267775 A1* | 9/2014 | Lablans | .............. | H04N 5/247 |
| | | | | 348/169 |
| 2018/0338111 A1* | 11/2018 | Mourkogiannis | .... | H04N 5/9305 |

\* cited by examiner

360° VIDEO MULTI-ANGLE ATTENTION-FOCUS RECORDING

TECHNICAL FIELD

The present disclosure is related generally to video recording and, more particularly, to a system and method for tracking views of interest in a 360° video recording using mobile electronic devices.

BACKGROUND

If a picture is worth a thousand words, then a video may be worth a thousand pictures. Indeed, videos for informational and entertainment purposes now represent a substantial portion of today's internet traffic. Still, video technology continues to evolve; even as the use of video over the internet continues to grow exponentially, new types of video are becoming possible.

One significant new type of video that has gained substantial support and wide-spread adoption is referred to as "360° video." In 360° video capture, video is captured over an angular field that is substantially the full circle (or sphere) of viewing, i.e., 360°. The video information thus captured contains 360° of viewable data, even though the viewer is limited to viewing a normal angular range at any given moment, This means that the viewer must direct his instantaneous view to whatever section of the 360° of video data is of the greatest interest.

Of course, therein lies a problem: The viewer often does not know a priori what will be of interest in the 360° video, and he will likely only be able to react after the fact when interesting events are perceived to occur outside of his instantaneous field of view. For example, if the 360° video is taken from within a vehicle and if the viewer's field of view is forward, then a horn may be heard to the right of the instantaneous field of view. By the time the viewer shifts his view to the right, the event that involved the horn sound may well be over.

The viewer may compensate by rewinding the video and playing it again while directing his field of view to the right in order to view the event that caused the horn sound. However, not only does this practice provide a disjointed user experience, but it also raises the possibility that interesting events or views may be missed entirely.

While the present disclosure is directed to a system that can eliminate some of the shortcomings noted in this Background section, it should be appreciated that any such benefit is not a limitation on the scope of the disclosed principles, nor of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, 360° video provides a new and exciting user experience but also suffers from a number of drawbacks. Chief among these is the fact that the viewer has a limited instantaneous field of view and must select only a portion of the available 360° of video data for viewing.

Since the user will typically not know beforehand what will be of interest in a given 360° video, the user will be forced to rewind, refocus, and replay whenever an event occurs outside the instantaneous field of view. As noted, this practice creates a disjointed user experience at best.

However, in an embodiment of the disclosed principles, one or more mobile electronic devices present during the 360° video-capture session are used to encode one or more selectable view angles within the captured video data. During playback, the user is able to select an encoded view angle while, in an embodiment, retaining an ability to redirect his view angle.

With this overview in mind, and turning now to a more detailed discussion in conjunction with the attached figures, the techniques of the present disclosure are illustrated as being implemented in a suitable computing environment. The following device description is based on embodiments and examples of the disclosed principles and should not be taken as limiting the claims with regard to alternative embodiments that are not explicitly described herein. Thus, for example, while FIG. 1 illustrates an example mobile device with which aspects of the disclosed principles may be implemented, it will be appreciated that other device types may be used, including but not limited to laptop computers, tablet computers, personal computers, embedded automobile computing systems, and so on.

Figure 1:
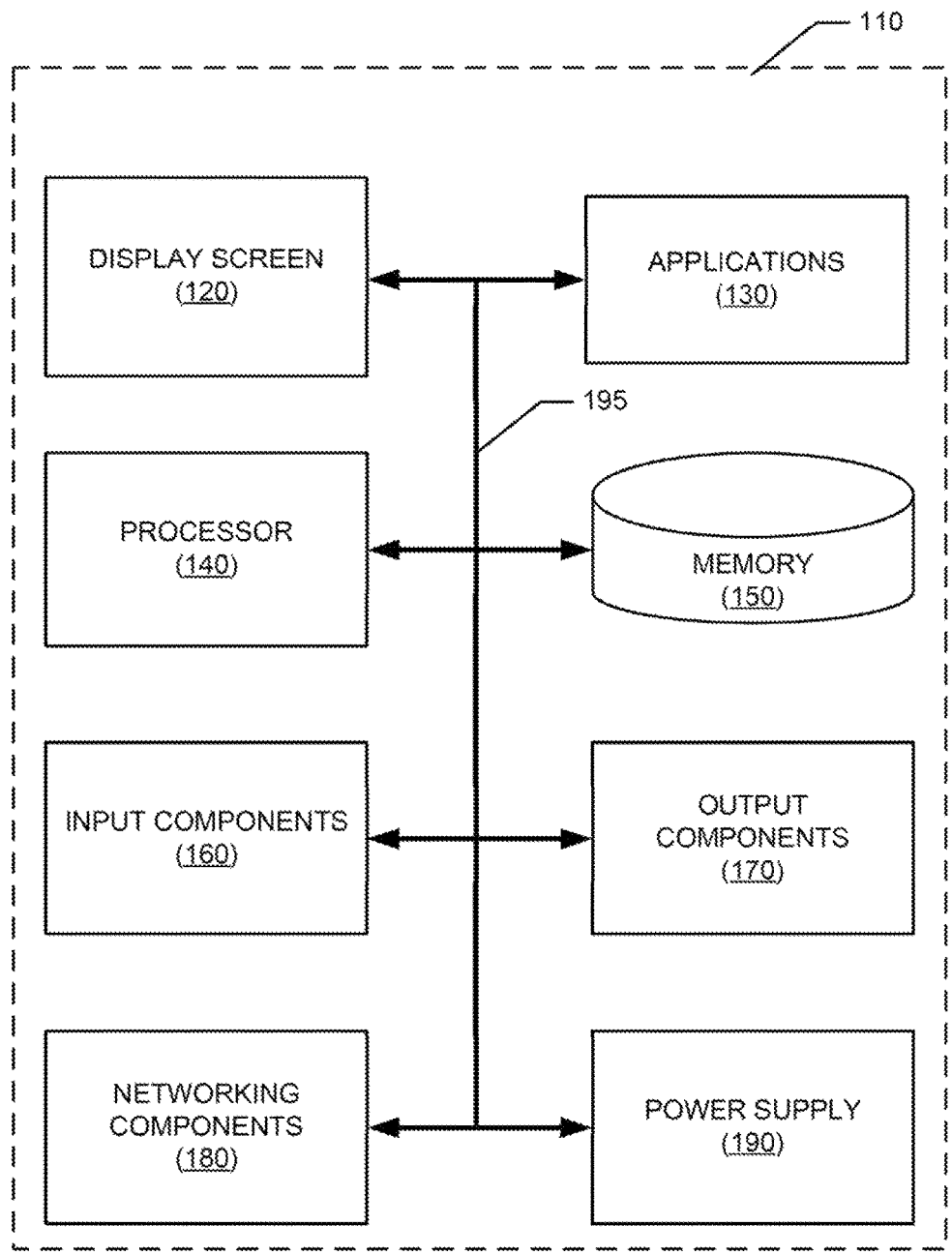
FIG. 1 is a simplified schematic of an example device with respect to which embodiments of the presently disclosed principles may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as an audio (whether human audible or not) sensor or microphone and text-input facilities, and one or more output components 170 such as text- and audio-output facilities, e.g., one or more speakers.

The processor 140 can be any of a microprocessor, microcomputer, application-specific integrated circuit, or the like. Similarly, the memory 150 may reside on the same integrated circuit as the processor 140. The memory 150 may also be accessed via a network, e.g., via cloud-based storage. The memory 150 may include a random-access memory or a read-only memory.

The information that is stored by the memory 150 can include program code associated with one or more operating systems or applications as well as informational data, e.g., program parameters, process data, etc. In an embodiment, the memory 150 includes audio or video buffer storage.

The operating system and applications are typically implemented via executable instructions stored in a non-transitory, computer-readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file-system service and handling of protected and unprotected data stored in the memory 150. Although many applications may provide standard or required functionality of the user device 110, in other cases applications provide optional or specialized functionality and may be supplied by third-party vendors or by the device manufacturer.

Finally, with respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device 110 is in communication during its ongoing operation.

In an embodiment, the device 110 includes known software and hardware networking components 180 to allow communications to and from the device 110. Such networking components 180 will typically provide wireless-networking functionality, although wired networking may be supported.

In an embodiment, a power supply 190, such as a battery or fuel cell, is included for providing power to the device 110 and its components. Moreover, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

Figure 2:
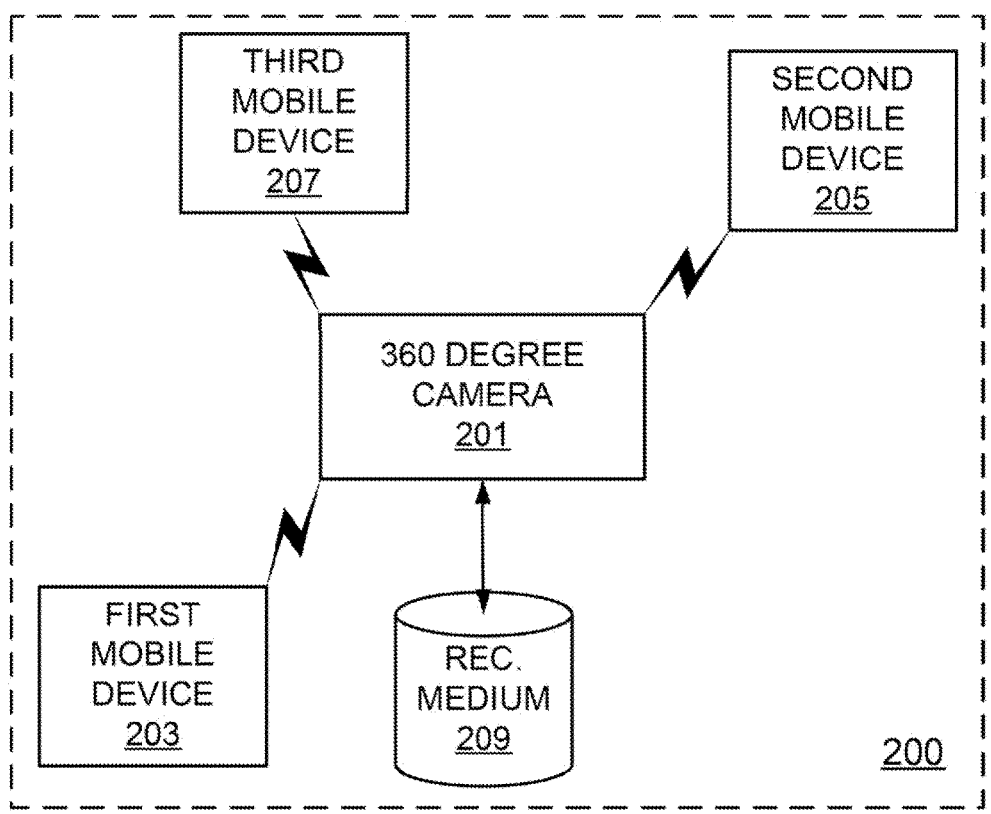
FIG. 2 is a network schematic showing a network environment within which embodiments of the presently disclosed principles may be implemented.

FIG. 2 is a network schematic illustrating a network environment within which embodiments of the presently disclosed principles may be implemented. The illustrated network environment 200 includes a 360° camera 201 wirelessly linked to a plurality of mobile electronic devices represented by a first device 203, a second device 205, and a third device 207. The 360° camera 201 is also linked to a recording medium 209 which may be a local or remote memory medium for example. In the illustrated embodiment, the recording medium 209 is shown in the form of a remote database.

The 360° camera 201 may implement any suitable 360° video-capture technology, e.g., multiple-lens direct capture, single- or multiple-lens compressed capture, and so on. The mobile electronic devices 203, 205, 207 are wireless communications devices such as cellphones in an embodiment of the disclosed principles and may communicate with the 360° camera 201 via one or more of WiFi, cellular, and Bluetooth channels. Each such device 203, 205, 207 includes attitude and position-detection sensor systems in a further embodiment. Such sensor systems may include for example inertial, gyroscopic, GPS, gravitometer, and magnetometer sensor systems.

Figure 3:
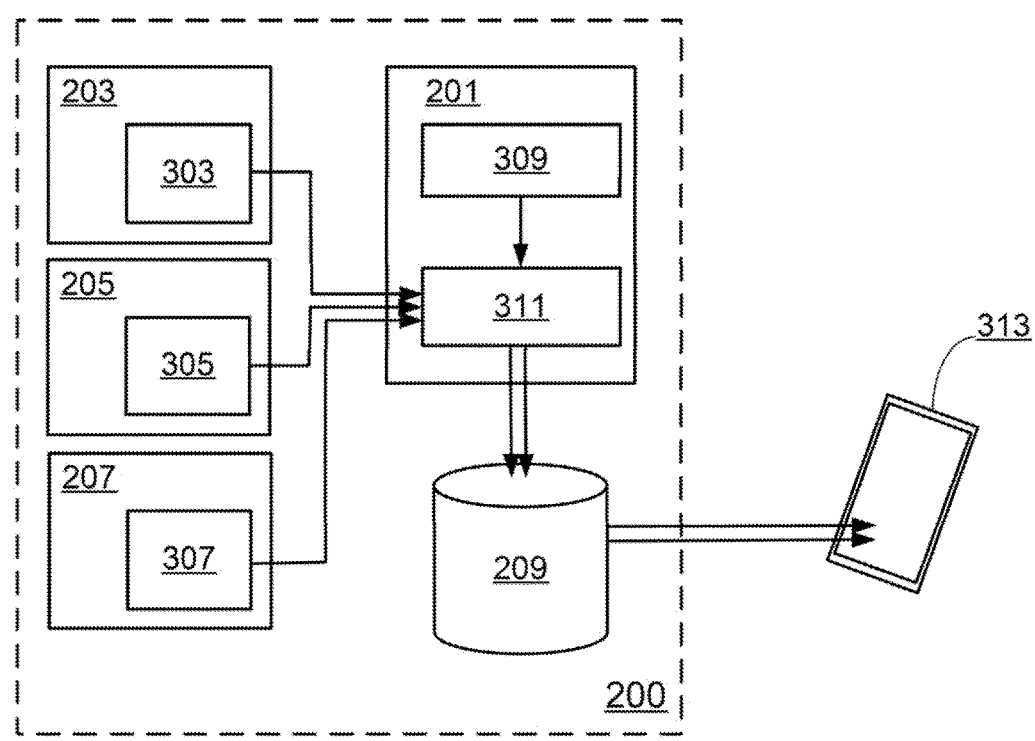
FIG. 3 is a functional schematic showing various functional elements in accordance with an embodiment of the presently disclosed principles.

FIG. 3 is a functional schematic showing various functional elements in accordance with an embodiment of the presently disclosed principles and in keeping with the network architecture of FIG. 2. In particular, in the illustrated embodiment, each mobile electronic device 203, 205, 207 has an associated positioning system 303, 305, 307 as noted above. The positioning system 303, 305, 307 of each mobile electronic device 203, 205, 207 sends positioning information to the 360° camera 201 during recording, wherein the positioning information of each device 203, 205, 207 may include either the focus of the respective device 203, 205, 207 or the position of the respective device 203, 205, 207.

The 360° camera 201 includes an image-capture system 309. The image-capture system 309 of the 360° camera 201 includes one or more lenses and one or more associated image-capture elements, which may be, for example, a charge-coupled device or other light-sensitive element. The image-capture elements of the image-capture system 309 feed their output to a video-data processor 311 which prepares video data for transmission or storage. Similarly, the positioning information provided by the positioning system 303, 305, 307 of the mobile electronic devices 203, 205, 207 is also provided as input to the video-data processor 311 which encodes the positioning information into or with the video data.

In this way, the video data include 360° of viewable video data but also contain indicators from the mobile electronic devices 203, 205, 207. These position data are usable by the video viewer at a user device 313 to select a view point from which to view the video without needing to manually control the view point. As noted above, the position data provide angles or positions of focus supplied by the mobile electronic device 203, 205, 207.

For example, a first one 203 of the mobile devices may be carried by a person or object that is one possible focus of the eventual viewer. For example, a sports player of interest may carry a mobile phone linked to the 360° camera. In this case, the 360° camera receives the position of the carried device and uses its own known position to compute a viewing angle that focuses on the sports player. This calculated viewing angle may be provided in the positioning information associated with the carried device.

In the same scenario, another mobile phone may be held in the stands by a fan who is focusing the view finder of the phone on plays and players of interest. The 360° camera receives the position and orientation of the fan's device and again uses its own known position to compute a viewing angle that focuses on the scenes that the fan found to be of interest. This calculated viewing angle may be provided in the positioning information associated with the fan's device.

In a variation, the mobile device acts as a viewfinder within the video data gathered by the 360° camera. In other words, the video seen by the user holding the mobile device is being sourced and sent from the 360° camera and not from the device's own camera, and the user of the mobile device is able to see the scene from the 360° camera's position rather than from the mobile device's position. In this way, it is unnecessary to calculate a viewing angle since the desired view itself is directly captured. In this embodiment, changes in the attitude and orientation of the mobile device are detected and encoded via the device's onboard sensors, and the data are sent to the 360° camera to designate the video view to be sent back to the device.

With respect to later viewing the captured 360° video, a user who is viewing the video is provided with an option, in an embodiment, to watch the video from any one of the captured view points. In a further embodiment, the user may exit a selected or default view point by controlling the view angle manually, e.g., via arrow controls or scroll controls.

Figure 4:
FIG. 4 is a simulated screen shot of a user interface in keeping with an embodiment of the disclosed principles.

A user interface in keeping with an embodiment of the disclosed principles is shown in FIG. 4. In the illustrated example display 400, a 360° video is shown playing in a primary view area 401 of the display 400. Below the primary view area 401, a control section 403 is provided as part of the display 400. The control section 403 includes a number of control elements. In the illustrated embodiment, the control elements include a playback-volume control 405 as well as playback controls 407, e.g., "play/pause," "rewind," "fast forward," etc.

In addition, the control section 403 includes a number of selectable viewpoints 409, 411, 413. Each selectable view point 409, 411, 413 implements a view focus, e.g., view angle, corresponding to one of the mobile device 203, 205, 207 tracked during video capture. The currently selected view point may be highlighted or otherwise distinguished. In an embodiment, each selectable view point also includes a label identifying the person or type of view associated with that view point, e.g., "fan," "player," "umpire," etc.

Figure 5:
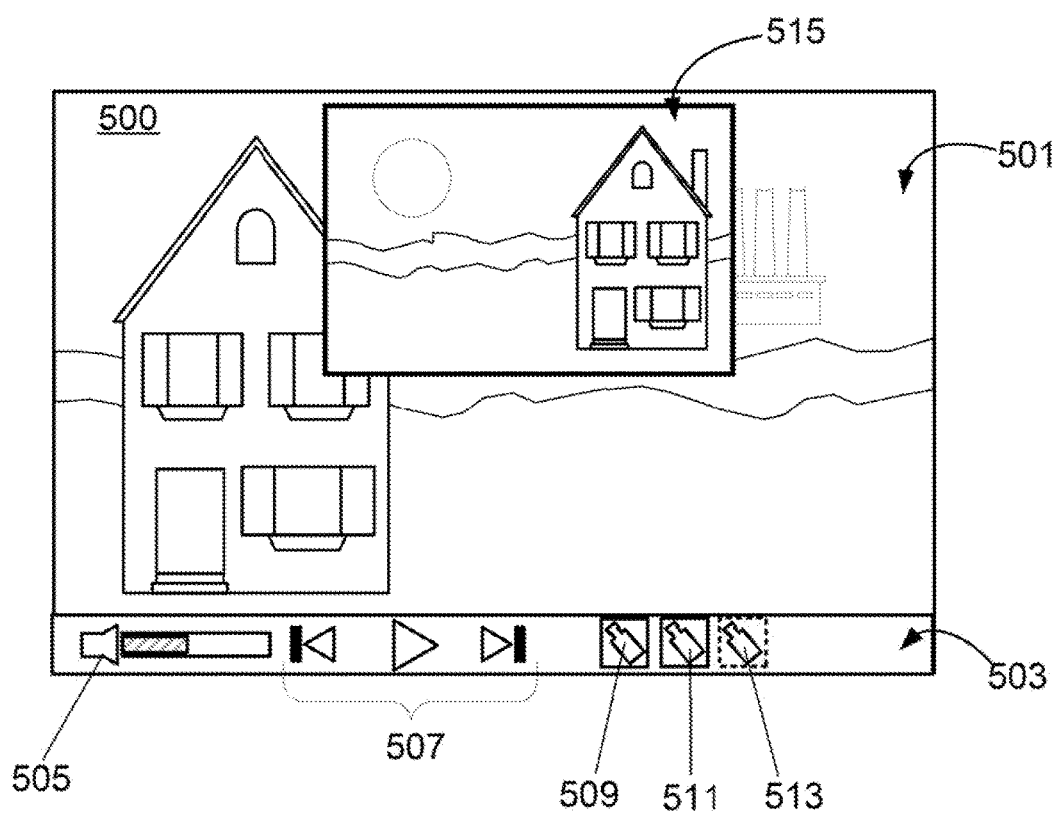
FIG. 5 is a simulated screen shot of a user interface in keeping with an alternative embodiment of the disclosed principles.

It should be noted that the various view points are not necessarily mutually exclusive during viewing. In one embodiment, multiple viewpoints may be selected for simultaneous split screen or picture-in-picture viewing. FIG. 5 is a user interface in keeping with this embodiment in the context of the video playback referenced in FIG. 4.

In the illustrated example, a first playback view, corresponding to the view shown in FIG. 4 (view point 509 (409)), is shown in the primary view area 501 of the display 500. However, an additional view is shown in a picture-in-picture viewing area 515. The additional view corresponds in the illustrated example to view point 511 (411), which is also indicated as having been selected.

Figure 6:
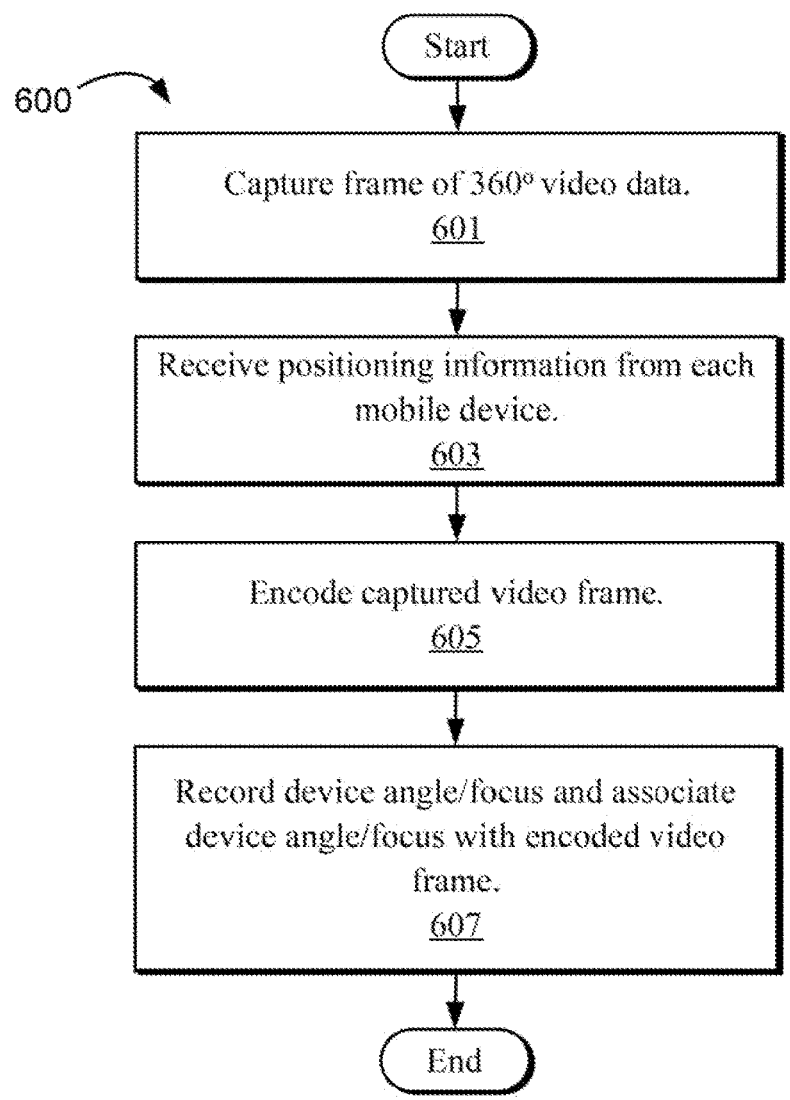
FIG. 6 is a flowchart showing a process of capturing 360° video data in accordance with an embodiment of the presently disclosed principles.

FIG. 6 is a flowchart showing a process 600 of capturing 360° video data in accordance with an embodiment of the presently disclosed principles. In particular, although other embodiments may be similar in many respects, the embodiment shown in FIG. 6 corresponds to an embodiment wherein the mobile devices associated with video capture are employed as view finders into the video data captured at the 360° camera itself. The process 600 assumes an initial condition wherein the mobile devices associated with video capture have been directly or indirectly linked to the 360° camera, e.g., via Bluetooth, WiFi, or another wired or wireless system.

At stage 601 of the process 600, the 360° camera captures a frame of 360° video data, which may include multiple still frames taken at different view angles. At stage 603, which may occur before, after, or during stage 601, and which may occur for every 360° frame or only for some longer interval or upon some trigger event, the 360° camera receives positioning information from the mobile devices. As noted above, the positioning information in this embodiment need only comprise, or correspond to, a device angle or a device focus.

The positioning information is time-stamped by the associated device in an embodiment, such that the 360° camera is able to synchronize each transmission of position information with the appropriate video frame. The 360° camera encodes the captured video frame at stage 605, and at stage 607, the 360° camera records the device angle or device focus for each mobile device such that it is associated with the encoded video frame in accordance with the time-stamp.

In an embodiment wherein positioning information is received less frequently than for each video frame, the 360° camera records the last known angle or focus for each device until data corresponding to a new angle or focus are received. It will be appreciated that angle and focus data may be absolute or incremental.

It will be appreciated that various systems and processes for 360° video multi-angle attention-focus recording have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of capturing view-point-encoded 360° video data with a 360° camera, the method comprising:
   capturing at the 360° camera a frame of video including a substantially 360° view;
   receiving respective position information from a plurality of mobile electronic devices linked to the 360° camera, the position information corresponding to a viewpoint of the respective mobile electronic device, wherein the viewpoint of a mobile electronic device comprises a view angle of the mobile electronic device, and wherein the viewpoint of a mobile electronic device further comprises a device focus of the mobile electronic device; and
   recording the captured video frame in association with the received position information such that one or more viewpoints may be selected by a viewer upon playback of a series of video frames including the captured video frame.

2. The method of claim 1 wherein the captured 360° video frame includes a plurality of sub-frames.

3. The method of claim 1 wherein the viewpoint of the mobile electronic device comprises a location of the mobile electronic device.

4. The method of claim 3 wherein one or more of the plurality of mobile electronic devices is associated with and moves in concert with an object in the captured 360° video frame.

5. The method of claim 1 further comprising: capturing and recording a second 360° video frame and recording the same received position information in association with the second 360° video frame.

6. The method of claim 5 further comprising: capturing a third 360° video frame and receiving supplemental positioning information from one of the plurality of mobile electronic devices and recording the third 360° video frame in association with the supplemental positioning information.

7. A 360° video camera for capturing view-point-encoded 360° video data, the camera comprising:
- an image-capture element;
- one or more lenses configured to focus gathered light onto the image-capture element to produce a video frame; and
- a controller configured to sense a position of multiple mobile electronic devices linked to the 360° video camera, the position information of each of the multiple mobile electronic devices corresponding to a viewpoint of that mobile electronic device, and to record the video frame in association with the position information such that one or more selectable viewpoints are available upon playback of a video material including the video frame, wherein the viewpoint of a mobile electronic device comprises a view angle of the mobile electronic device and wherein the viewpoint of a mobile electronic device further comprises a device focus of the mobile electronic device.

8. The camera of claim 7 wherein the recorded video frame includes a plurality of sub-frames.

9. The camera of claim 7 wherein the viewpoint of a mobile electronic device comprises a location of the mobile electronic device.

10. The camera of claim 9 wherein the mobile electronic device is associated with and moves in concert with an object in the captured video frame.

11. The camera of claim 7 wherein the controller is further configured to record a second video frame and to record the same received position information in association with the second video frame.

12. The camera of claim 11 wherein the controller is further configured to record a third video frame, receive supplemental positioning information from at least one of the multiple mobile electronic devices, and record the third video frame in association with the supplemental positioning information.

13. A method of recording a frame of 360° video data corresponding to a scene, the method comprising:
- identifying multiple viewpoints of interest in the scene at a particular time;
- capturing a 360° video frame of the scene at the particular time; and
- recording the captured 360° video frame and the multiple identified viewpoints of interest such that they are linked, thereby allowing a playback user to select one of the multiple identified viewpoints of interest from which to view the 360° video frame, wherein each of the one or more viewpoints of interest comprises a view angle of the one or more mobile electronic devices, a device focus of the one or more mobile electronic devices, and a location of the one or more mobile electronic devices.

14. The method of claim 13 wherein identifying the one or more viewpoints of interest in the scene at a particular time comprises receiving positioning information from one or more mobile electronic devices to which the scene is also accessible and translating the positioning information to viewpoint information.

* * * * *